(12) United States Patent
Harvey

(10) Patent No.: US 7,841,783 B2
(45) Date of Patent: Nov. 30, 2010

(54) MINIATURIZED TURRET-MOUNTED CAMERA ASSEMBLY

(75) Inventor: William B. Harvey, Laytonsville, MD (US)

(73) Assignee: Brandebury Tool Company, Inc., Gaithersburg, MD (US)

( * ) Notice: Subject to any disclaimer, the term of this patent is extended or adjusted under 35 U.S.C. 154(b) by 393 days.

(21) Appl. No.: 11/707,767

(22) Filed: Feb. 16, 2007

(65) Prior Publication Data

US 2008/0267612 A1  Oct. 30, 2008

Related U.S. Application Data

(60) Provisional application No. 60/774,862, filed on Feb. 16, 2006.

(51) Int. Cl.
*G03B 17/00* (2006.01)
(52) U.S. Cl. ........................ 396/428; 348/143
(58) Field of Classification Search ......... 396/327–328, 396/427–428; 348/143
See application file for complete search history.

(56) References Cited

U.S. PATENT DOCUMENTS

| | | | | |
|---|---|---|---|---|
| 3,720,147 A | * | 3/1973 | Bemis | 396/427 |
| 3,859,899 A | * | 1/1975 | Mills | 454/164 |
| 5,121,215 A | * | 6/1992 | Boers et al. | 348/373 |
| 5,463,432 A | * | 10/1995 | Kahn | 352/243 |
| 5,627,616 A | * | 5/1997 | Sergeant et al. | 396/427 |
| 6,200,042 B1 | * | 3/2001 | Tamura et al. | 396/427 |
| 7,128,479 B2 | * | 10/2006 | Chapman | 396/428 |
| 7,283,155 B1 | * | 10/2007 | Marks, Jr. | 348/85 |
| 7,473,040 B2 | * | 1/2009 | Kenoyer et al. | 396/428 |
| 2003/0077082 A1 | * | 4/2003 | Ito | 396/428 |
| 2003/0090353 A1 | * | 5/2003 | Robinson et al. | 335/220 |
| 2003/0194230 A1 | * | 10/2003 | Tamura | 396/428 |
| 2004/0184798 A1 | * | 9/2004 | Dumm | 396/428 |
| 2007/0041726 A1 | * | 2/2007 | Lee | 396/427 |
| 2007/0189764 A1 | * | 8/2007 | Ingalls et al. | 396/427 |

* cited by examiner

*Primary Examiner*—Christopher Mahoney
(74) *Attorney, Agent, or Firm*—Lieberman & Brandsdorfer, LLC

(57) ABSTRACT

A light weight camera mounting assembly allowing for tilt and pan of a camera through a significant portion of a spherical rang of view with minimal parts count, minimal weight and minimal weight in the rotated portion of the assembly. A retraction/extension assembly for a light weight camera with minimal weight and complexity. Doors which open to allow a camera to extend beyond the surface of a vehicle and close to protect the camera and allow for landing of the vehicle without external skids.

10 Claims, 13 Drawing Sheets

MINIATURIZED TURRET-MOUNTED CAMERA ASSEMBLY

CLAIM FOR PRIORITY

This application claims the benefit of provisional application No. 60/774,862 filed Feb. 16, 2006.

BACKGROUND OF THE INVENTION

The present invention relates to mounting assemblies for small, lightweight cameras. More specifically, the present invention relates to movable mounting assemblies allowing pan and tilt of small lightweight cameras.

SUMMARY OF THE INVENTION

A miniaturized, light weight, turret-mounted camera assembly is disclosed. The assembly can be stationarily mounted, can be mounted on a ground based or water based vehicle or can be mounted on a lightweight remote-controlled aerial vehicle. The features of the configuration of the present invention make it particularly advantageous in light-weight and/or small space applications, such small ariel vehicles or light weight ground or water applications.

The present invention has a remote-feedback, servo-operated pan function and a control-cable-linked tilt function, the combination of which results in simplified movement of the camera and a smaller moving mass of components within the turret.

The pan function comprises a rotating, vertically oriented, U-shaped camera yoke which is chain (or other positive drive means, such as toothed belt) driven by a servomechanism. The the position feedback potentiometer (pot) has been removed from the servo drive and relocated for reuse. The pot is connected to the yoke in a manner that permits the pot to feedback the horizontal angle of the yoke, and thus the camera's pan position (rather than the position of the servo drive shaft) to the controller. As a part of the servo modification, any mechanical stops on the servo drive train are removed to allow continuous rotation of the servo motor. This permits the servo drive train to be geared up or down without changing the desired camera rotation, which may include 360 degrees of movement. The rotation amount may be modified by changing the feedback ratio of the pot drive.

The tilt function comprises the use of a flexible control-cable to rotate the angle of the camera with respect to the vertical axis of the yoke. The control cable is routed to the camera turret through a sheath which passes through the center of rotation of the yoke, thus permitting the yoke to turn (i.e., pan) without also turning the sheath or retracting or extending the control cable. The driving end of the tilt cable is attached to the inside of the turret shell, offset from the vertical axis of the yoke such that a pull or push on the cable will result in a rotational displacement of the turret ball, and thus the camera, about a horizontal axis defined by the connection points of the U-shaped yoke to the turret. The driven end of the control cable may be attached directly to either a servo-driven crank handle for small applications or to a bell crank mechanism for larger (longer stroke) applications.

The attachment of the control cable to both the turret and the drive mechanism may be either a fixed connection, resulting in twisting of the cable within the sheath during panning movements, or the connections may be made via swivels, permitting total freedom of movement. Cheaper, fixed-end connections with their accompanying twisting of the control cable has been shown to operate in an acceptable manner in actual practice. To accommodate continuous pan rotation, when desired, slip rings can be incorporated into the tilt function linkage.

The turret-mounted camera assembly further comprises a camera connection harness, comprising wiring for camera power as well as cabling for signal transmission. In the case of a wireless camera, no signal cable would be required. Additional conductors for features such as zoom and iris adjustments, or digital data input may also be installed.

The use of the control cable in combination with the remote potentiometer linkage minimizes the amount of hardware directly associated with the movement of the camera. This inventive assembly provides for a much simplified operation of the combined pan/tilt functions than is found in the prior art and permits the overall assembly to be reduced in both size and weight, fostering a significant improvement in remote guided aircraft camera systems.

Alternatively, as illustrated in FIGS. 6 through 13, the camera assembly can be mounted on an extension/retraction assembly 40 which substitutes for the base 10 illustrated in FIGS. 1-6. It may be desired to retract the camera unit when desired instead of having the semi-shell constantly extending beyond, a mounting surface. As an example, it can be advantageous to retract the camera unit when used on air vehicles for reduction of drag when in flight and for ease of storage and reduction of damage to the camera assembly. It is also important to retract the camera assembly on air craft which do not have landing gear. Air craft without landing gear is common in unmanned air vehicles. Unmanned air vehicles are frequently hand and/or catapult launched. If the camera unit does not extend below the aircraft during take off and/or landing, the skids needed can be much smaller and present less drag in flight. With the present invention, the doors can be used for landing, eliminating the need for skids.

The extension/retraction assembly of the present invention minimizes weight with a carbon fiber side plate chassis and uses pivot points that are integral with the pan and tilt mounting bolts. The design of the present invention minimizes parts count and allows the unit to be light weight. The unit is locked in the retracted position by implementation of an over center banana shaped link that allows clearance when the servo output shaft is supported on both sides of the output arm. This type of support is essential because of the extreme load that may occur during a hard landing. Additionally, the banana shaped link, while made of carbon fiber in a preferred embodiment to save weight, can flex under the extreme loads that may be experienced during hard landings.

While retraction can be used alone to reduce drag and to allow for minimized landing skids, to further protect the camera as well as to streamline the unit in flight, doors may be provided. Frequently, during the autonomous dashing stage of flight to a particular destination, the surveillance camera is not used. With the doors closed, the vehicle is cleaner aerodynamically and can move faster and more efficiently. The doors open like the hard outside wings of a beetle and are preferably oriented for minimum drag.

A further advantage of the design of the present invention which includes doors, is the ability to use the doors as landing skids, thus eliminating the drag associated with landing skids required when a camera is mounted extending below the fuselage. The door unit is isolated from the camera by employing elastomeric members (rubber or foam) that capture the camera unit with the retracting mechanism and also attach to the door mechanism and attaching plate.

The sequencing of the doors and the extension/retraction are electronically coordinated, allowing for landings without external skids without transmitting undue shock to the camera and protecting the camera assembly during flight and storage.

BRIEF DESCRIPTION OF THE DRAWINGS

For a better understanding of the nature of the present invention, reference is had to the following figures and detailed description, wherein like elements are accorded like reference numerals, and wherein.

DETAILED DESCRIPTION OF EXEMPLARY EMBODIMENTS

Figure 1:
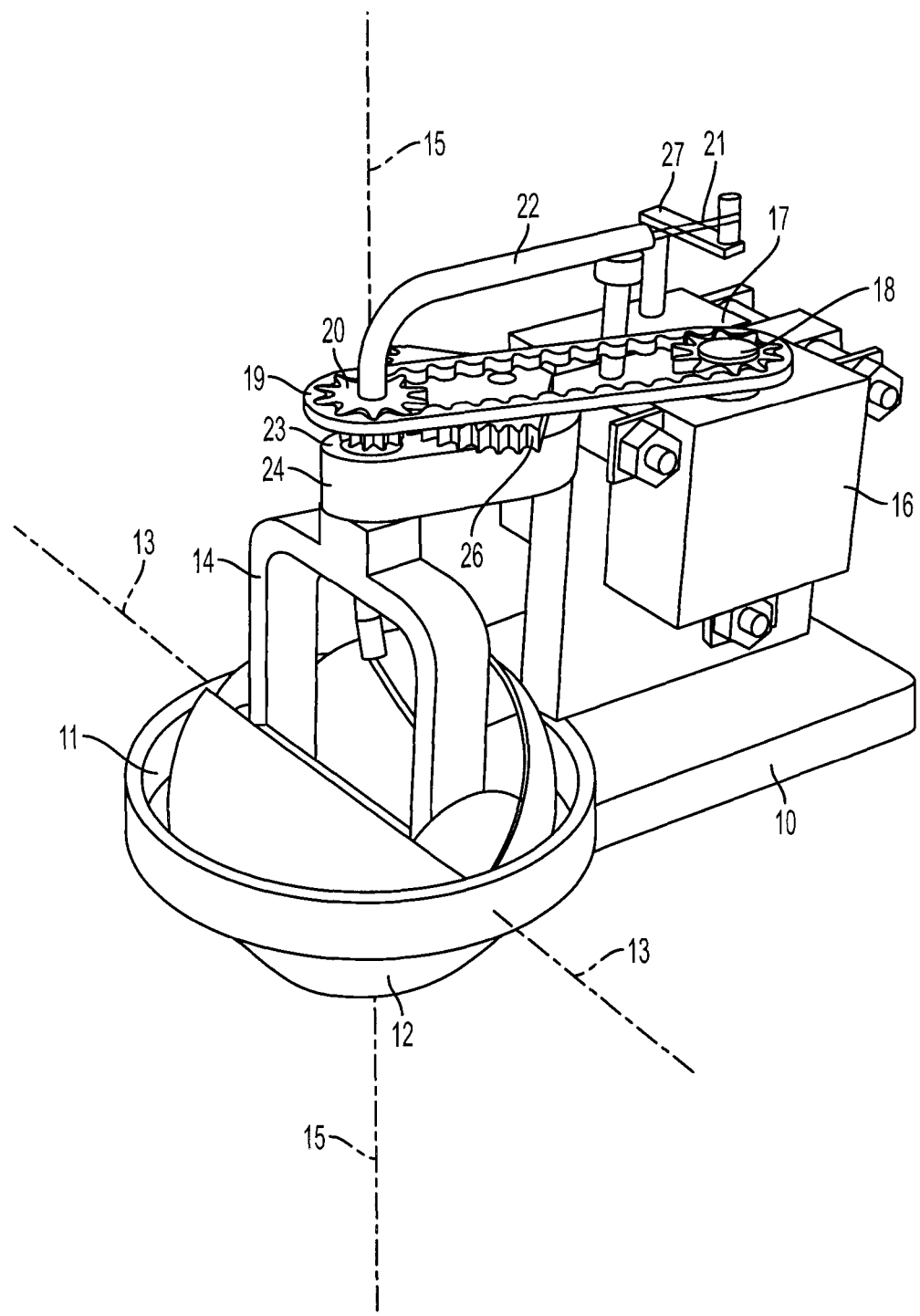
FIG. 1 is a perspective view of the turret-mounted camera as seen from the upper front right perspective.
Figure 2:
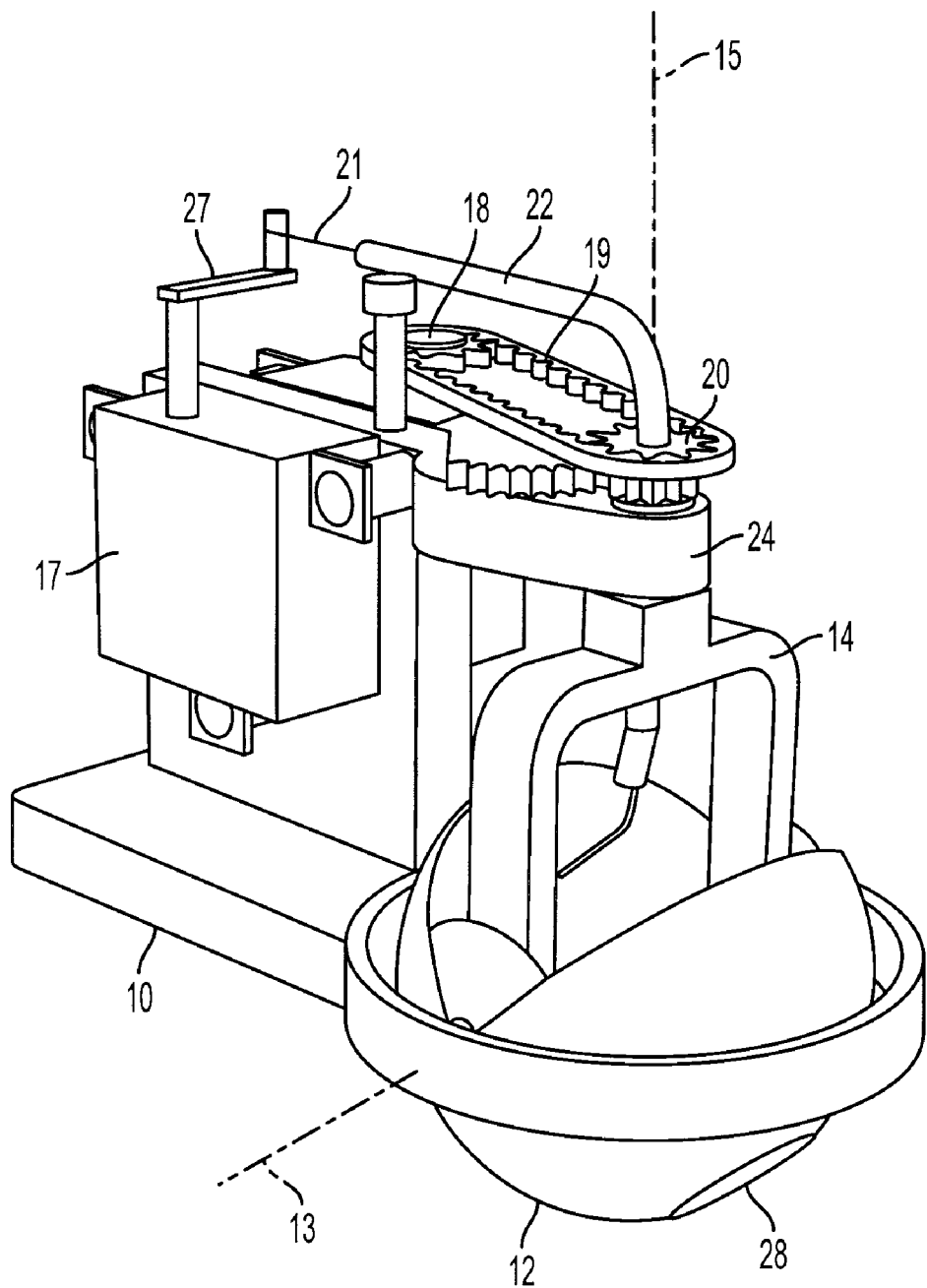
FIG. 2 is a perspective view of the turret-mounted camera as seen from the upper front left perspective.
Figure 3:
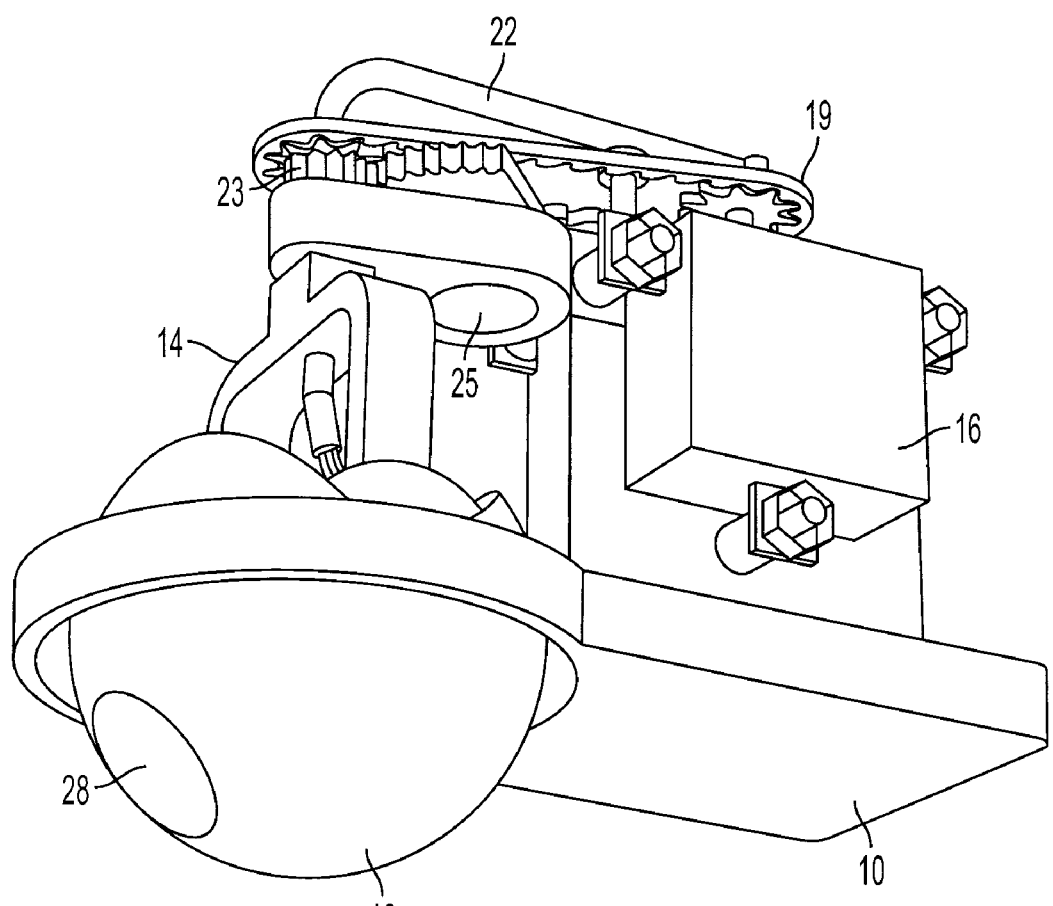
FIG. 3 is a perspective view of the turret-mounted camera as seen from the lower front left perspective.
Figure 4:
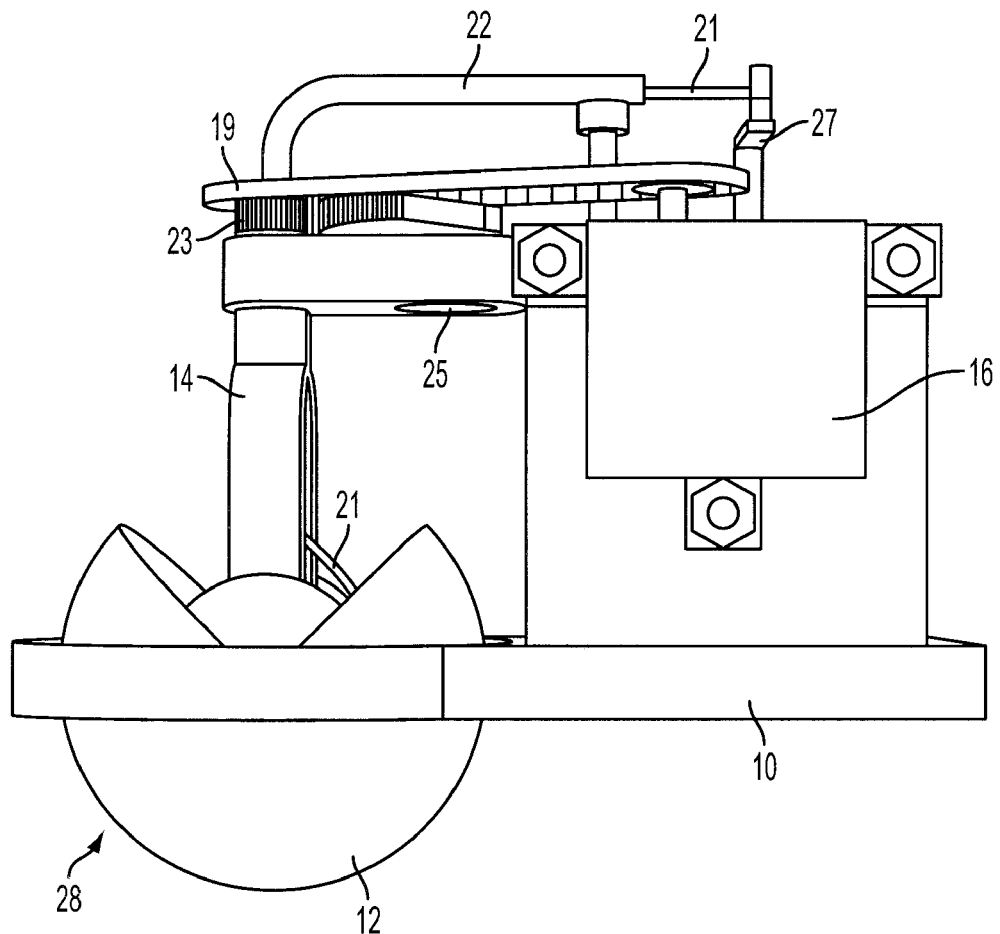
FIG. 4 is perspective view of the turret-mounted camera as seen from the right side of the assembly.

The camera mount includes a base portion 10 with a circular opening 11. The camera semi-shell 12 is pivotally mounted to yoke 14 within the opening 11 so as to allow the semi-shell 12 to tilt about tilt axis 13. The semi-shell 12 is not connected to the base 10 so that it can also rotate about pan axis 15. The tilt and pan axis are illustrated generally horizontal and vertical, however, the assembly of the present invention can be oriented in any direction and in fact in typical use will assume unlimited orientations.

A pan servo 16 and a tilt servo 17 are mounted to the base 10. The pan servo 16 includes a motor which drives pan drive gear 18. Drive transfer link 19, driven by drive gear 18, can be a toothed drive belt as illustrated or a drive chain or any other positive drive mechanism which will allow for positive pan positioning of the camera semi-shell 12. Drive transfer link 19 is connected to pan gear 20 for rotation of the yoke 14 about pan axis 15. Tilt cable 21 and tilt cable conduit 22 pass through the center of pan gear 20 and do not rotate with the pan gear 20. Tilt cable 21 slides laterally within conduit 22.

The pan function comprises a rotating, vertically oriented, U-shaped camera yoke 14 driven by servomechanism 16, 18, 19 and 20. Gear 20 drives a follower gear 23 and the end of yoke 14 which is rotatably mounted in housing arm 24. A typical position feedback potentiometer 25 used with a typical servo motor is connected to follower gear 21 through feedback gear 26. The potentiometer 25 is connected to the yoke 14 in a manner that permits the potentiometer 25 to feedback the horizontal rotation angle of the yoke 14, and thus the pan position of the camera semi-shell 12 (rather than the position of the servo motor drive shaft) to a controller. As a part of the servo modification, any mechanical stops on the servo drive train within servo 16 are removed to allow continuous rotation of the servo motor. This permits the servo drive train to be geared up or down without changing the desired camera rotation, which may include 360 degrees of movement. The rotation amount may be modified by changing the feedback ratio of the potentiometer drive gear 26.

The tilt function is implemented by use of a flexible control-cable 21 housed within a sheath 22. The cable is pulled and pushed by crank 27 driven by servo 17, to rotate the angle of the camera with respect to the axis 13 of the yoke. The extent of rotation is monitored by potentiometer housed within the servo 17 as well known in the art. The control cable 21 is routed to the camera semi-sphere turret 12 through a sheath 22 which passes through the center of rotation of the yoke 14, thus permitting the yoke 14 to turn (i.e., pan) about axis 15 without also turning the sheath 22 or retracting or extending the control cable 21. The driving end of the tilt cable 21 is attached to the inside of the turret semi-shell 12, offset from the axis 13 of the yoke 14 such that a pull or push on the cable 21 will result in a rotational displacement of the turret semi-shell ball 12, and thus the camera 28, about a horizontal axis 13 defined by the connection points of the U-shaped yoke 14 to the turret ball 12. The driven end of the control cable 21 may be attached directly to either a servo-driven crank handle 27 for small applications or to a bell crank mechanism (not illustrated) for larger (longer stroke) applications.

The attachment of the control cable 21 to both the turret 12 and the drive mechanism 27 may be either a fixed connection, resulting in twisting of the cable within the sheath during panning movements which will not effect tilt orientation if the cable material is properly selected using known twistable cables, or the connections may be made via swivels, permitting total freedom of movement. Cheaper, fixed-end connections with their accompanying twisting of the control cable has been shown to operate in an acceptable manner in actual practice. To accommodate continuous pan rotation, when desired, slip rings can be incorporated into the tilt function linkage.

Figure 5:
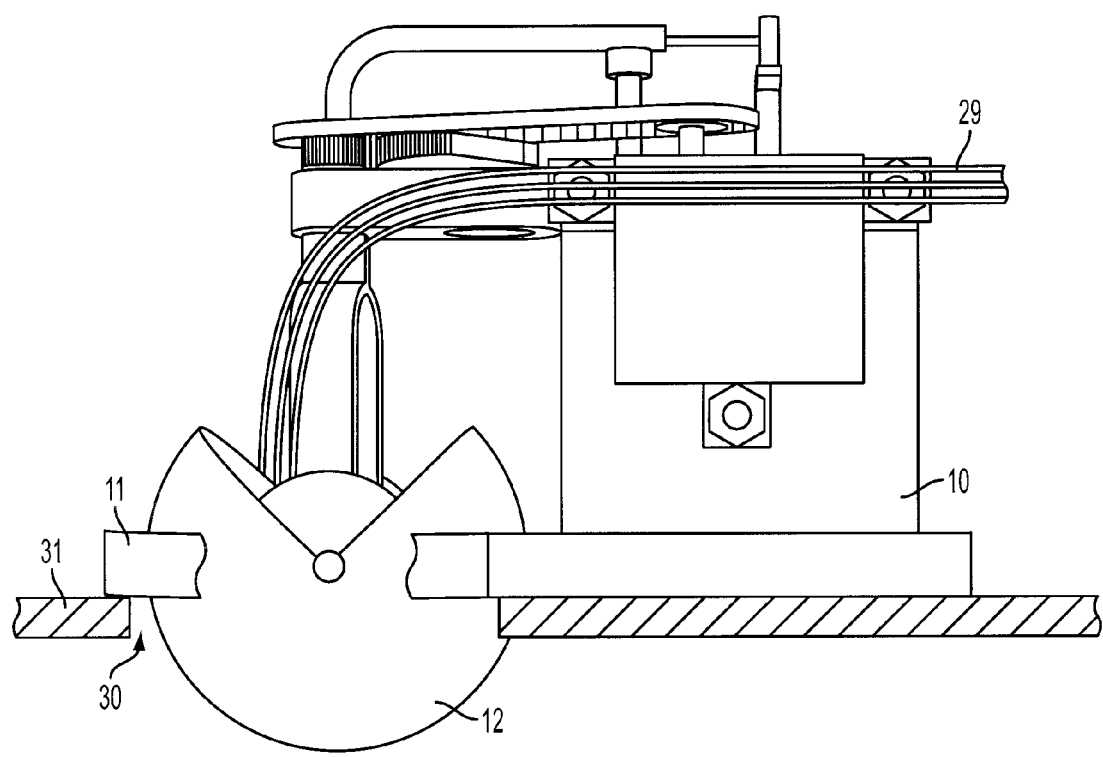
FIG. 5 is a mechanical perspective of the invention as seen from the right side of the assembly.
Figure 6:
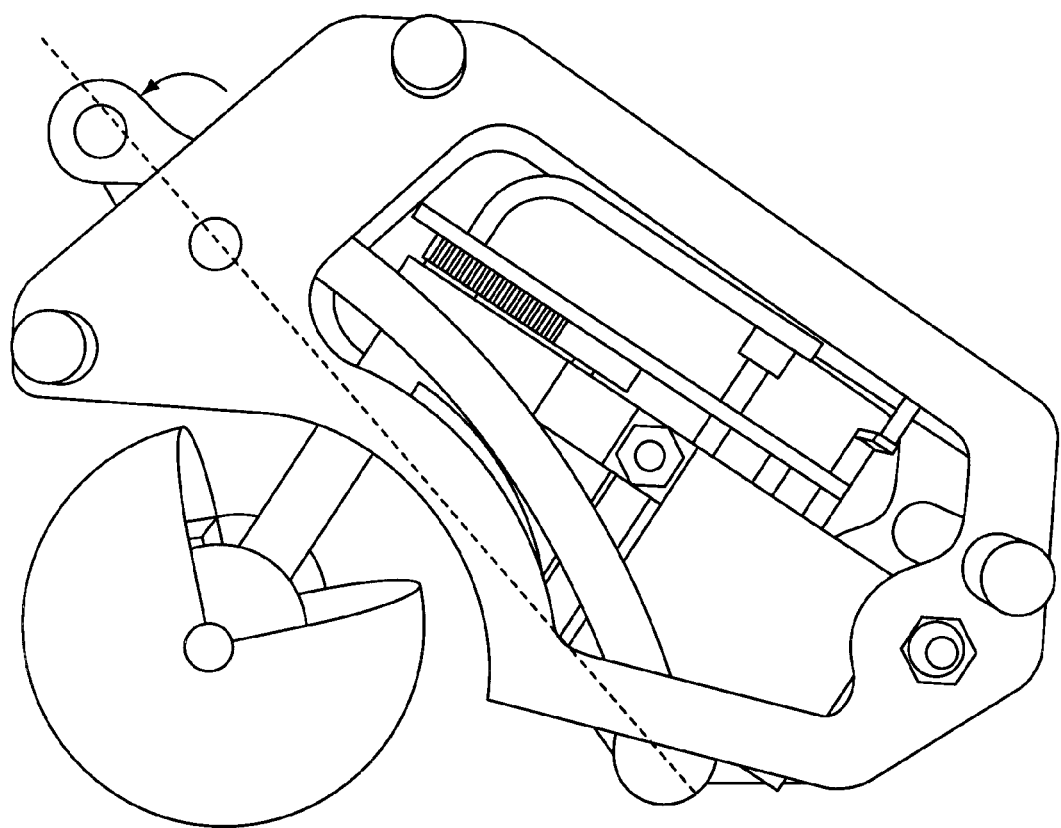
FIG. 6 is a perspective view of a camera assembly mounted on a extension/retraction assembly.
Figure 7:
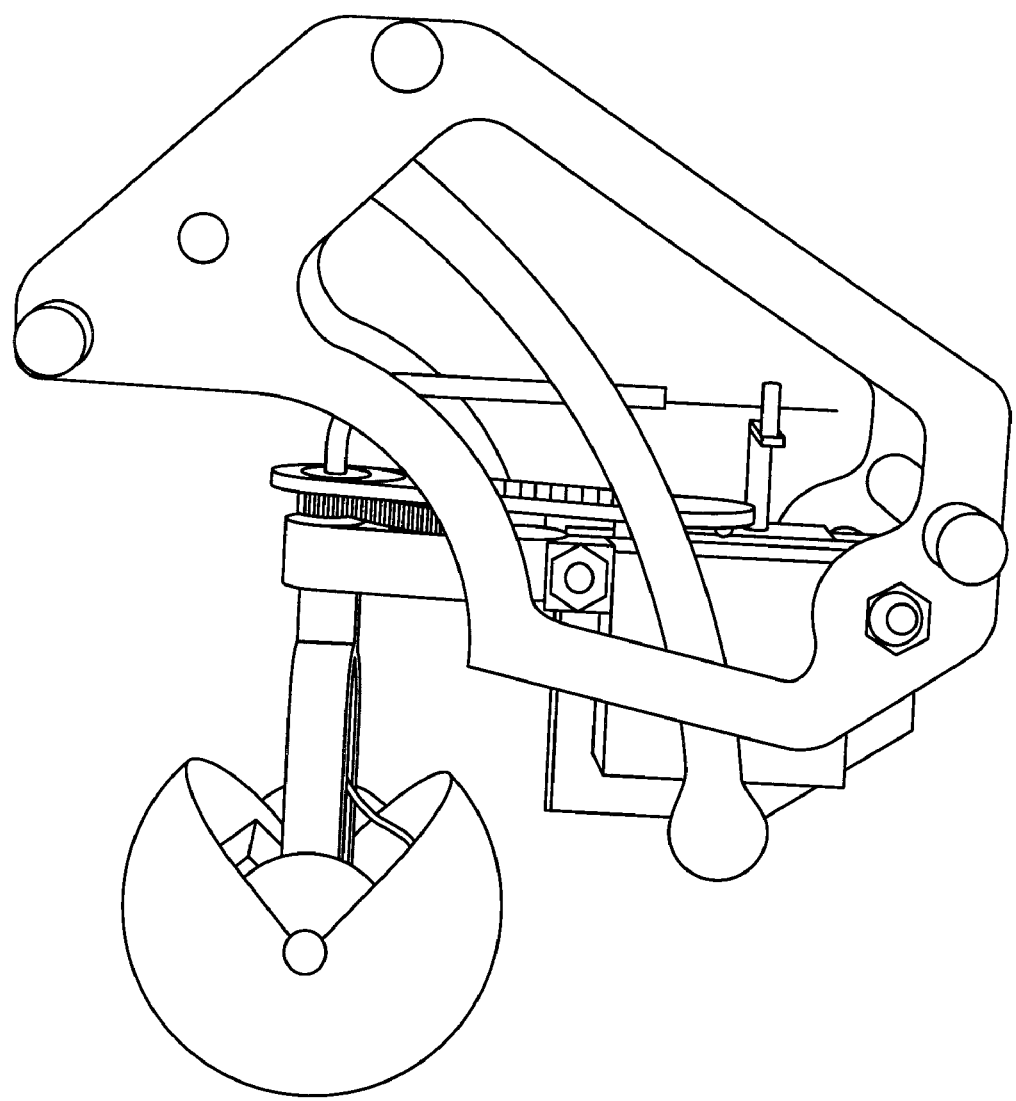
FIG. 7 is a perspective view of a camera assembly mounted on a extension/retraction assembly.
Figure 8:
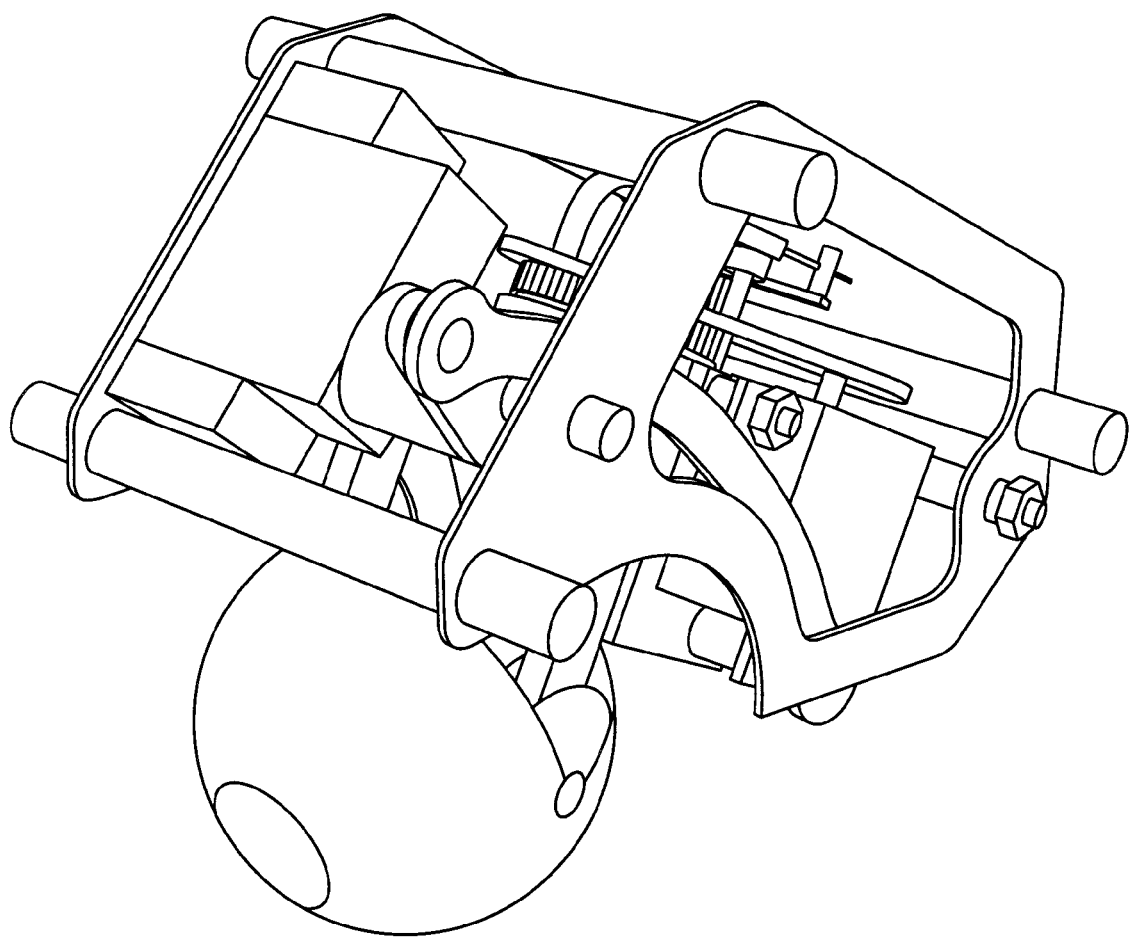
FIG. 8 is a perspective view of a camera assembly mounted on a extension/retraction assembly.
Figure 9:
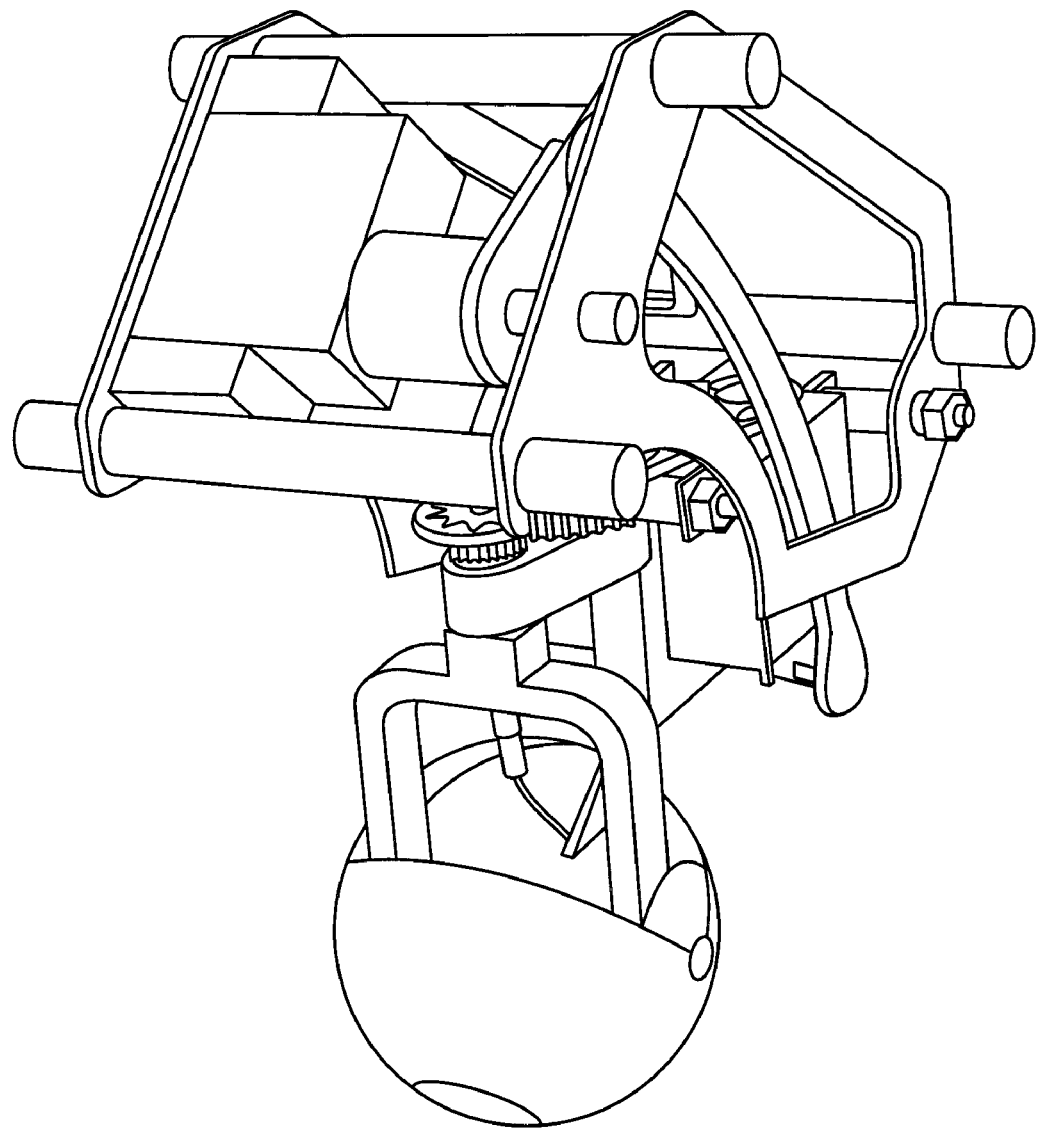
FIG. 9 is perspective view of a camera assembly mounted on a extension/retraction assembly.
Figure 10:
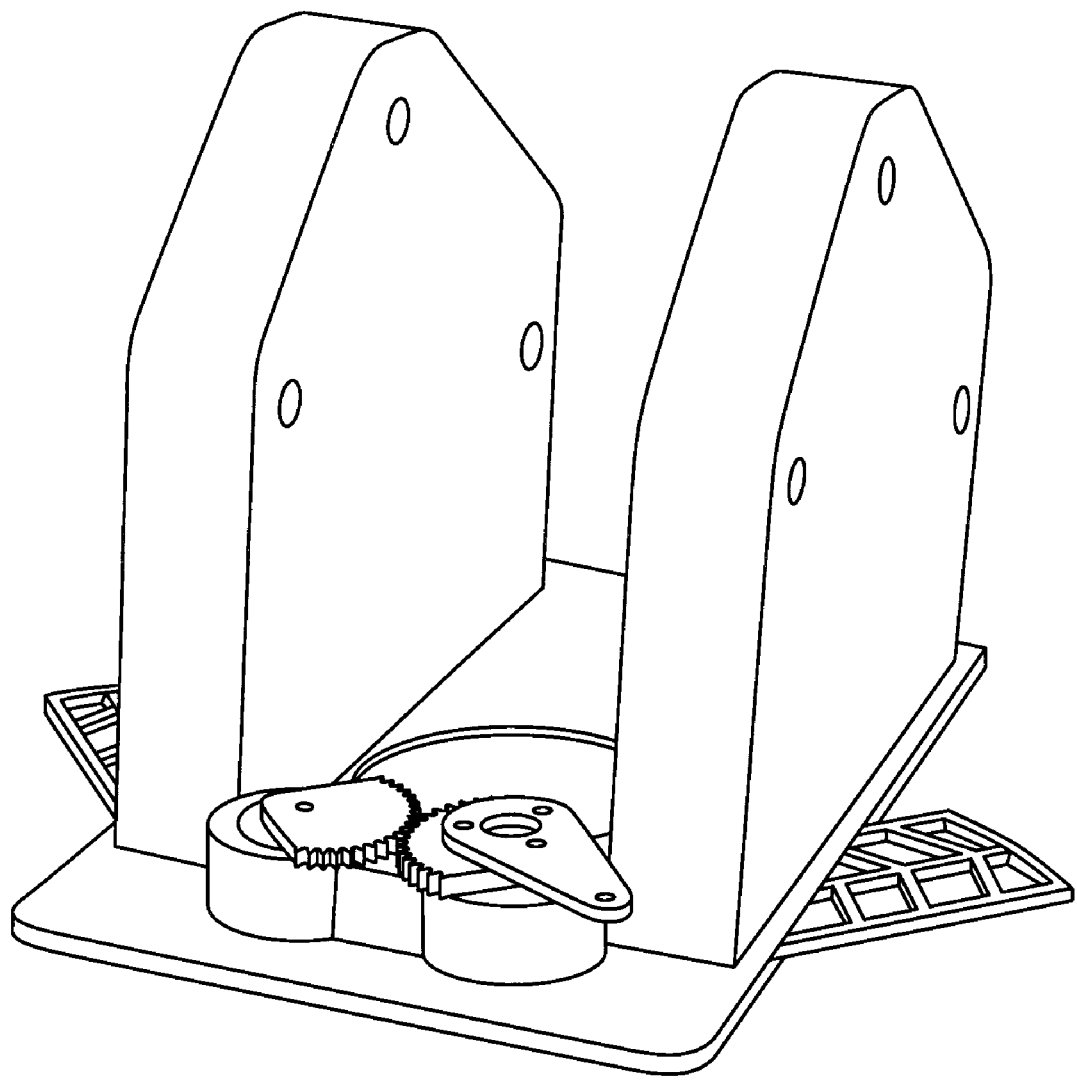
FIG. 10 is a perspective view of a mount and doors for an extension/retraction assembly without a camera assembly or an extension/retraction assembly.
Figure 11:
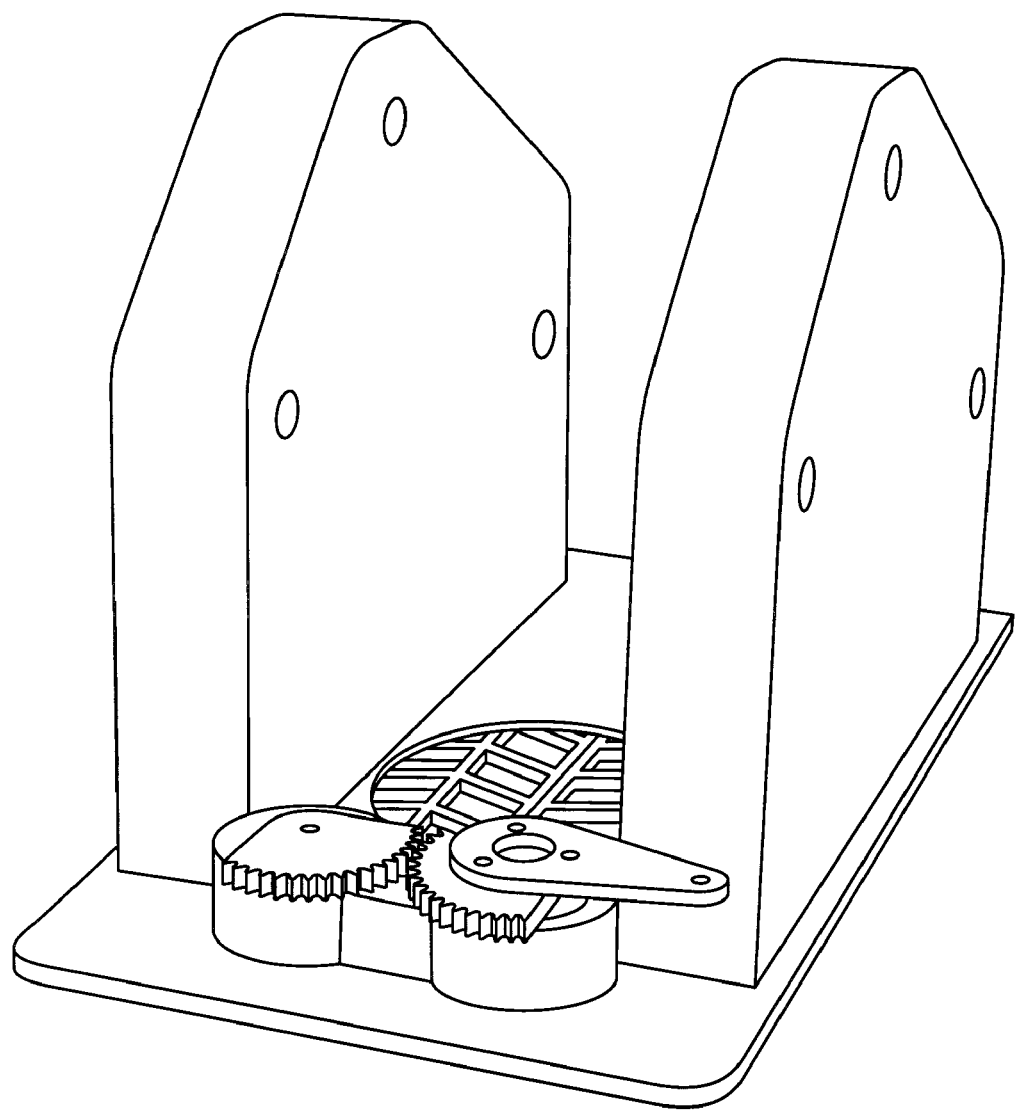
FIG. 11 is a perspective view of a mount and doors for an extension/retraction assembly without a camera assembly or an extension/retraction assembly.
Figure 12:
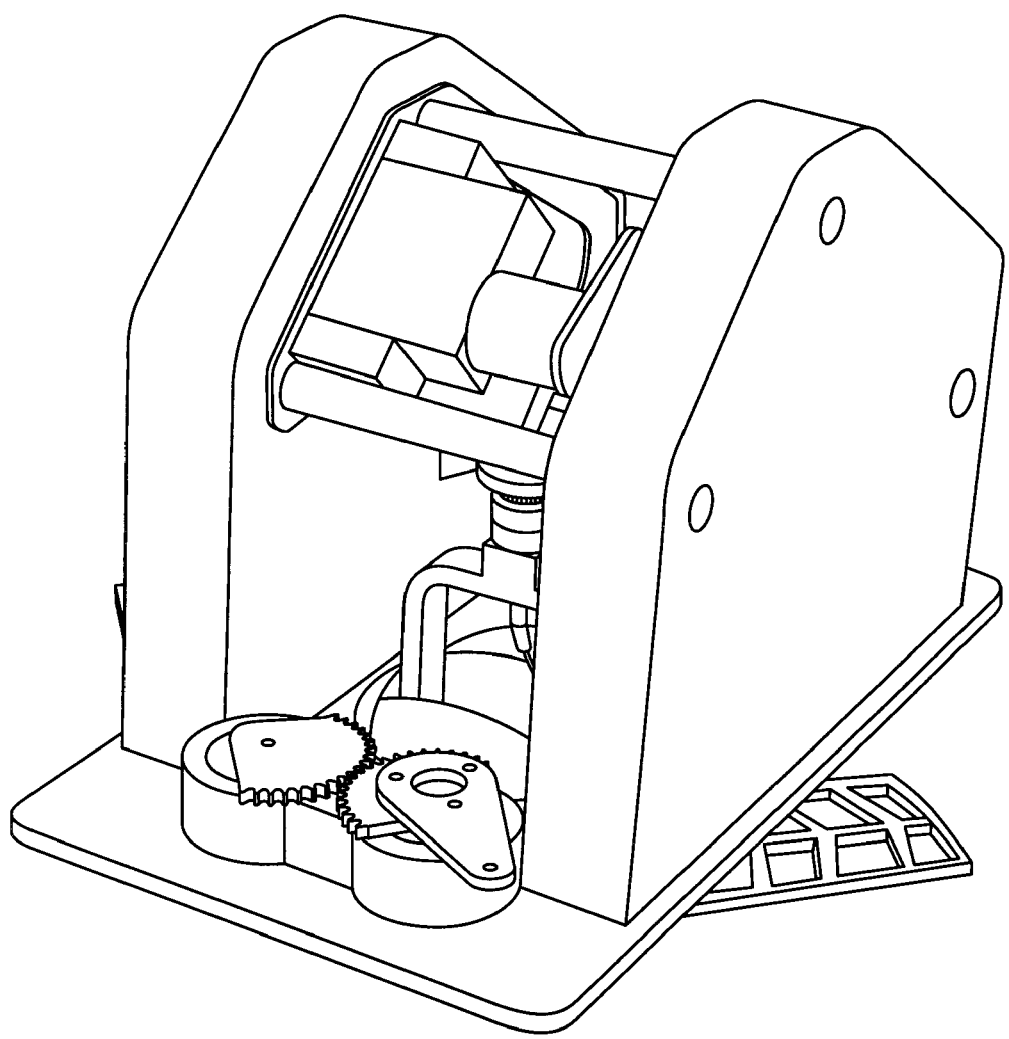
FIG. 12 is a perspective view of a mount and doors for an extension/retraction assembly with a camera assembly and an extension/retraction assembly.
Figure 13:
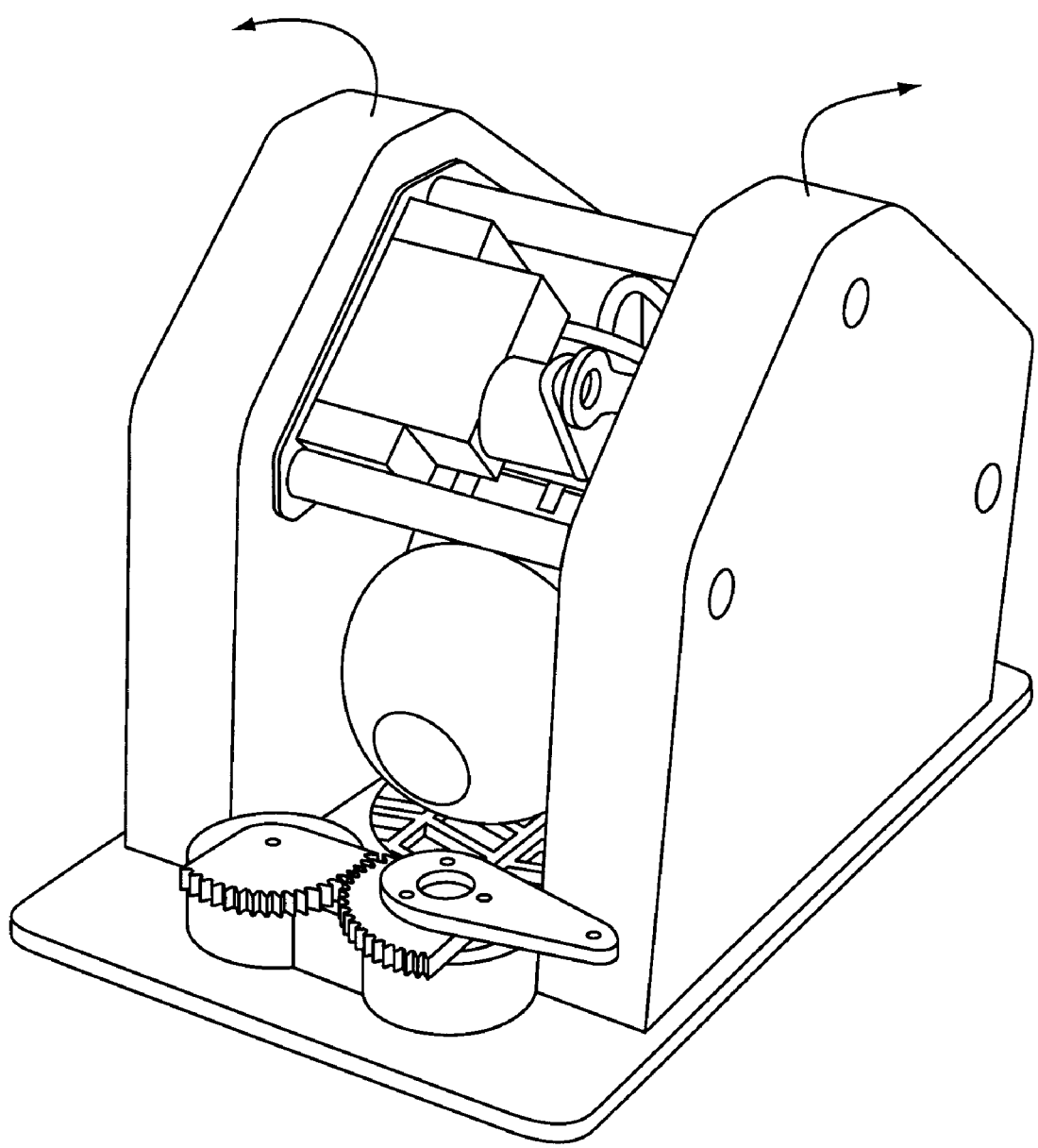
FIG. 13 is a perspective view of a mount and doors for an extension/retraction assembly with a camera assembly and an extension/retraction assembly.

The turret-mounted camera assembly also includes a camera connection harness 29 illustrated in FIG. 5. The harness 29 includes wiring for camera power as well as cabling for signal transmission. In the case of a wireless camera, no signal cable would be required. Additional conductors for features such as zoom and iris adjustments, or digital data input may also be installed.

The use of the control cable 29 in combination with the remote potentiometer linkage minimizes the amount of hardware directly associated with the movement of the camera. This inventive assembly provides for a much simplified operation of the combined pan/tilt functions than is found in the prior art and permits the overall assembly to be reduced in both size and weight, fostering a significant improvement in remote guided aircraft camera systems.

The base 10 provides sufficient mounting flexibility that the camera assembly can be mounted in any orientation so long as the camera is oriented in the desired direction of view. The camera assembly can be mounted on an exterior surface such as a wall or the exterior of a vehicle. As illustrated in FIG. 5, the camera assembly can be mounted such that the semi-shell 12, housing the camera 28 extends through a hole 30 in a plate 31, the hole 30 being generally coextensive with hole 11. In FIG. 5, a portion of the base 10 is illustrated in cutaway view in the area of hole 11 to illustrate the tilt axis 13 and the protrusion of the semi-shell 12 through hole 30 in plate 31. Plate 31 can be an external surface of a vehicle, such as the lower portion of the fuselage of a surveillance aircraft or the top surface of the body of a surveillance vehicle.

Alternatively, as illustrated in FIGS. 6 through 13, the camera assembly can be mounted on an extension/retraction assembly 40 which substitutes for the base 10 illustrated in FIGS. 1-6. It may be desired to retract the camera unit when desired instead of having the semi-shell constantly extending beyond a mounting surface. As an example, it can be advantageous to retract the camera unit when used on air vehicles for reduction of drag when in flight and for ease of storage and reduction of damage to the camera assembly. It is also important to retract the camera assembly on air craft which do not have landing gear. Air craft without landing gear is common in unmanned air vehicles. Unmanned air vehicles are frequently hand and/or catapult launched. If the camera unit does not extend below the aircraft during take off and/or landing, the skids needed can be much smaller and present less drag in flight. With the present invention, the doors can be used for landing, eliminating the need for skids.

The extension/retraction assembly of the present invention minimizes weight with a carbon fiber side plate chassis and uses pivot points that are integral with the pan and tilt mounting bolts. The design of the present invention minimizes parts count and allows the unit to be light weight. The unit is locked in the retracted position by implementation of an over center banana shaped link that allows clearance when the servo output shaft is supported on both sides of the output arm. This type of support is essential because of the extreme load that may occur during a hard landing. Additionally, the banana shaped link, while made of carbon fiber in a preferred embodiment to save weight, can flex under the extreme loads that may be experienced during hard landings.

While retraction can be used alone to reduce drag and to allow for minimized landing skids, to further protect the camera as well as to streamline the unit in flight, doors may be provided. Frequently, during the autonomous dashing stage of flight to a particular destination, the surveillance camera is not used. With the doors closed, the vehicle is cleaner aerodynamically and can move faster and more efficiently. The doors open like the hard outside wings of a beetle and are preferably oriented for minimum drag.

A further advantage of the design of the present invention which includes doors, is the ability to use the doors as landing skids, thus eliminating the drag associated with landing skids required when a camera is mounted extending below the fuselage. The door unit is isolated from the camera by employing elastomeric members (rubber or foam) that capture the camera unit with the retracting mechanism and also attach to the door mechanism and attaching plate.

The sequencing of the doors and the extension/retraction are electronically coordinated, allowing for landings without external skids without transmitting undue shock to the camera and protecting the camera assembly during flight and storage.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

I claim:

1. A camera mount comprising:
    a base;
    a yoke pivotally mounted to the base;
    a camera semi-shell pivotally mounted to the yoke;
    a pan servo to rotate the yoke with respect to a pan axis, the pan axis being perpendicular to the base;
    a tilt servo to rotate the camera semi-shell with respect to a tilt axis, the tilt axis being parallel to the base, wherein a rotational displacement of the camera semi-shell about the tilt axis is controlled by a control cable driven by the tilt servo, wherein said control cable is routed to the camera semi-sphere through a sheath passing through the center of yoke rotation; and
    first and second position feedback means for monitoring an extent of rotation implemented by said pan and tilt servos.

2. The camera mount of claim 1, wherein the first position feedback means is a potentiometer connected to the yoke, said potentiometer communicating a pan position of the camera semi-shell to a controller.

3. The camera mount of claim 1, wherein the second position feedback means is a potentiometer housed within the tilt servo to communicate a tilt position of the camera semi-shell to a controller.

4. The camera mount of claim 1, wherein attachment of the control cable to the semi-shell and a crank is selected from the group consisting of: fixed connection and swivel connection.

5. The camera mount of claim 1, further comprising a camera connection harness.

6. A method for operating a camera mount comprising:
    mounting a yoke pivotally over a base;
    mounting a camera semi-shell pivotally to the yoke;
    a pan servo for rotating the yoke with respect to a pan axis, the pan axis being perpendicular to the base;
    a tilt servo for rotating the camera semi-shell with respect to a tilt axis, the tilt axis parallel to the base;
    controlling a rotational displacement of the camera semi-shell about the tilt axis through a control cable driven by the tilt servo, wherein said control cable is routed to the camera semi-sphere through a sheath passing through the center of yoke rotation; and
    monitoring the extent of rotation implemented by the pan and tilt servos with first and second position feedback means.

7. The method of claim 6, wherein the first position feedback means is a potentiometer connected to the yoke, said potentiometer communicating a pan position of the camera semi-shell to a controller.

8. The method of claim 6, wherein the second position feedback means is a potentiometer housed within the tilt servo for communicating a tilt position of the camera semi-shell to a controller.

9. The method of claim 6, wherein said control cable is controlled by a crank driven by the tilt servo.

10. The method of claim 9, wherein an attachment of the control cable to the turret and a crank is selected from the group consisting of: fixed connection and swivel connection.

* * * * *